Jan. 28, 1964  J. B. HATCHER  3,119,359
DIRECT SEEDER
Filed March 8, 1961  3 Sheets-Sheet 1

INVENTOR
JOHN B. HATCHER

BY

ATTORNEY

INVENTOR
JOHN B. HATCHER

BY

ATTORNEY

Jan. 28, 1964   J. B. HATCHER   3,119,359
DIRECT SEEDER

Filed March 8, 1961   3 Sheets-Sheet 3

INVENTOR
JOHN B. HATCHER

BY
ATTORNEY 3,119,359
DIRECT SEEDER
John B. Hatcher, 901 Oleander Drive, SE., Aiken, S.C.
Filed Mar. 8, 1961, Ser. No. 94,407
2 Claims. (Cl. 111—83)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a machine which clears land of brush and directly seeds the cleared land in one operation.

For many years the pulp and paper companies and other land owners have been clearing extensive areas of scrub oak and reclaiming them with pine plantations. This has been such an expensive procedure that it ruled out such activity by most of the small landowners.

Attempts have been made in the past to reduce the cost of the operation by using available clearing equipment, such as fire plows. These attempts proved to be unsuccessful because, even in medium size scrub oak, the tractor had to travel over the trees which were pushed down and this placed a too-heavy burden on the fire plow, causing increased breakdowns and maintenance costs. After clearing, it was then necessary to seed the furrow in a separate step. Furthermore, the furrow created was the ordinary dish-shaped or concave furrow with the lowest point in the center. When seed was planted in such a furrow, erosion of the surrounding soil would cover the seed to too great a depth.

Accordingly, one object of this invention is to provide a plow which will clear a strip of brush level enough to permit a tractor to travel unhindered. Another object is to provide a machine which will directly seed the cleared strip. Still another object is to provide a plow which will cut a furrow having a convex profile. A still further object is to provide a plow which will cut a furrow with a barrier along its outside edges to prevent erosion, a small ditch to catch soil wash, and which has a slight crown to prevent siltation over the seed.

These and other objects which will be apparent to those skilled in the art are accomplished by the invention described below.

In general, the foregoing objects are accomplished by the use of a pair of forwardly converging blades, preferably forming a V-type front end having a flared out lower edge and a cutting edge ground into the flare. Winged out portions in the rear are provided to smooth the cast to enable the tractor to travel on a relatively smooth path. The V-type blade is so shaped as to create a furrow having a barrier along its edges to prevent erosion, a convex profile, and ditches to catch soil wash. To prevent the tip of the blades from either skipping or burying itself too deeply, stabilizing means are provided in advance of the blade to maintain the plow on a relatively constant level. Behind the blade there are provided means for depositing seed at regular intervals along the furrow and for pressing the seed into the soil.

So that the invention will be more readily understood, reference is made to the following detailed description and to the accompanying drawings in which.

Figure 1:
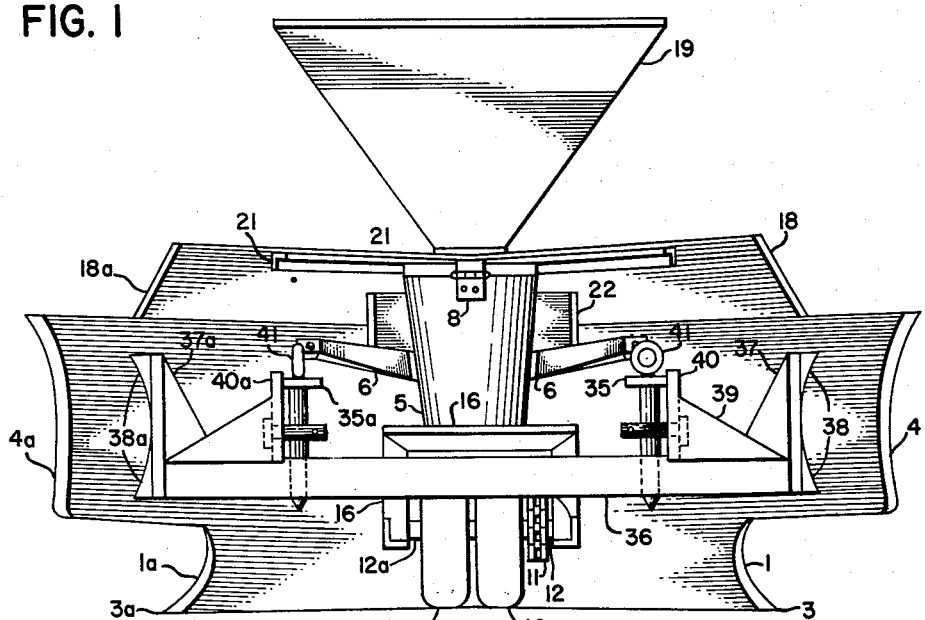
FIGURE 1 is a rear elevation of the plow showing the general disposition of the V-type blade and seeding mechanism.
Figure 2:
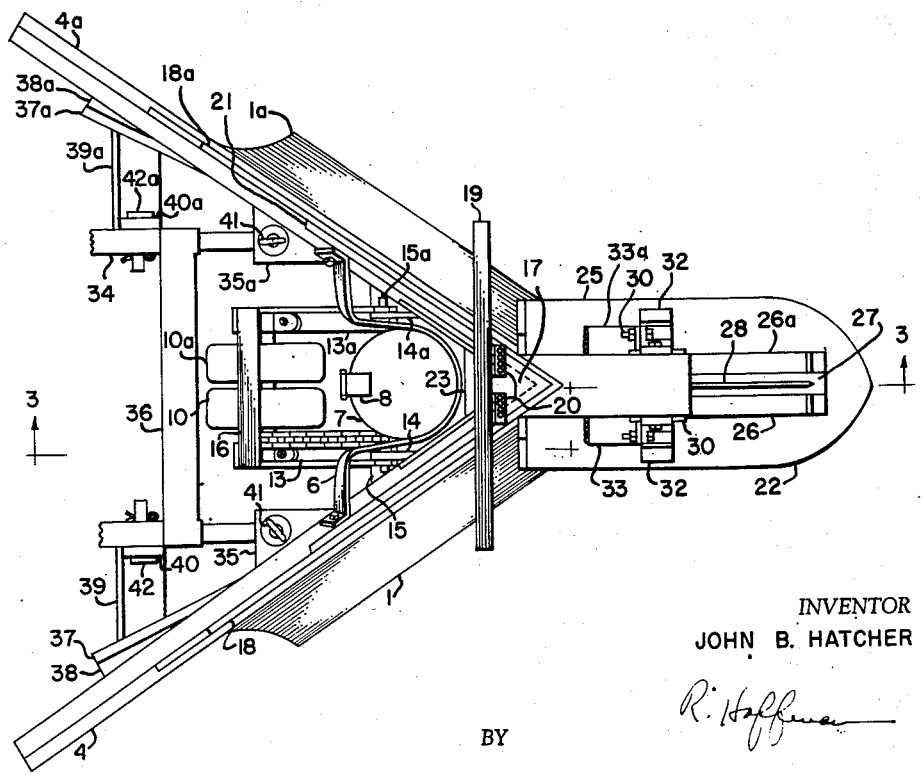
FIGURE 2 is a plan view of the plow showing relative locations of the blade, stabilizing means, and seeding means.
Figure 4:
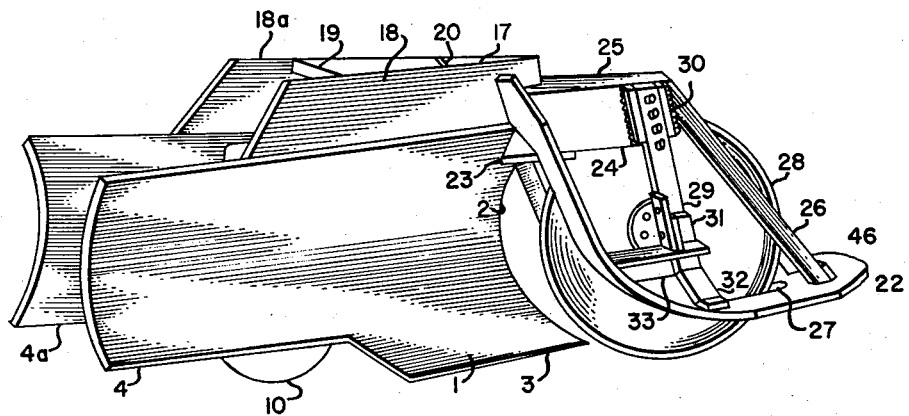
FIGURE 4 shows the shape and location of the blade and stabilizing means whereby the above stated objects are accomplished.

Referring to FIGURES 2 and 4, the plow of this invention is provided with a pair of blades 1 and 1a joined to form a single V-blade with the apex 2 forming the leading edge. As seen from FIGURES 1, 2, and 4, the blades are flared outward at the bottom and are provided with cutting edges 3 and 3a, respectively, at the bottom of the flares. Rearwardly, as seen from FIGURES 1 and 4, the blades are provided with wings 4 and 4a, respectively, which are actually extensions of the blades and are narrower than the forward portions of the blades which have the flared cutting edges. The lower edges of the wings are higher above the surface of the soil than the flared cutting edges. As also evident from FIGURES 1 and 4, this is accomplished by forwardly undercutting the wings 4 and 4a. These wings smooth the soil thrown to the sides by the blades, form a relatively level path on which the tractor travels, and produce an erosion-preventing barrier.

A commercial seeder is mounted in the apex of the V. This seeder, shown in FIGURES 1, 2, and 3, comprises a hopper 5, secured by means of strap 6, to the inner surfaces of blades 1 and 1a, a cover 7, and a hinge 8 by means of which the cover is secured to the hopper. The seed-depositing mechanism, which is conventional and which is not illustrated, is operated by sprocket wheel 9 which is driven by wheels 10 and 10a through sprocket chain 11 as the wheels roll over the ground. The wheels rotate on axles 12 and 12a which are journaled in pivot arms 13 and 13a by means of any suitable bearing. Pivot arms 13 and 13a are pivotally mounted on brackets 14 and 14a by means of pins 15 and 15a, respectively. A yoke 16 secured to pivot arms 13 and 13a provides rigidity for the wheel assembly.

To protect the seeder, there is provided a stationary cover plate 17 secured in any suitable manner, as by welding, to seeder guard plates 18 and 18a welded to the top edges of the V-blade. In addition, a hinged cover plate 19, mounted by means of hinges 20, provides both access to and further protection for hopper 5. Cover 19 rests in the closed position on stop 21 which is secured in any suitable manner to the inner surfaces of guard plates 18 and 18a.

Figure 3:
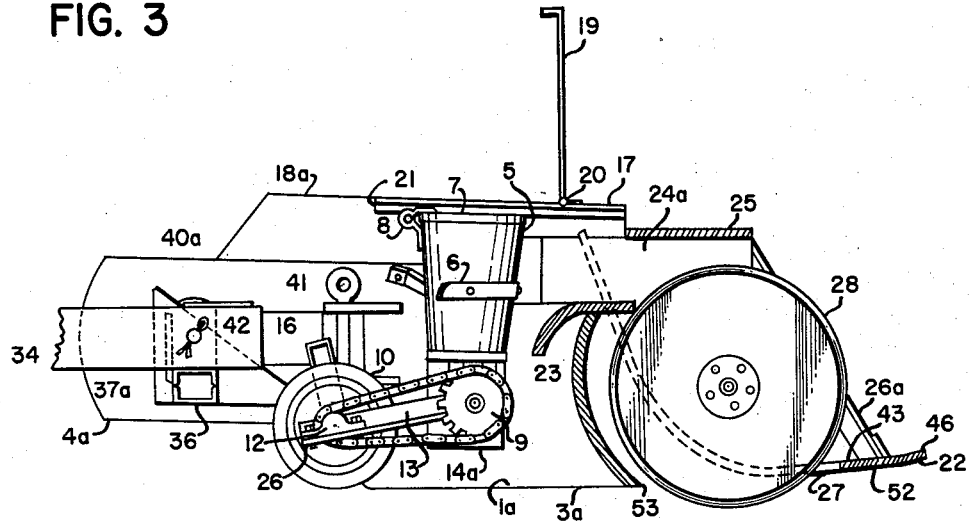
FIGURE 3 is a section on line 3—3 of FIGURE 2 showing the method of mounting the seeding means and the method of coupling the plow to the tractor.

In front of the apex of the V-blade is a heavy steel sled-like member 22 which is rigidly secured to the plow. Thus, as seen in FIGURES 2, 3, and 4, the top end of the sled is secured, as by welding, to the forward ends of seeder guard plates 18 and 18a. To further insure rigidity, a horizontal transverse plate 23, for reinforcing the junction of the V-blade, is secured to the top of the junction and is surmounted by a pair of forward-extending plates 24 and 24a which, in turn are capped by horizontal plate 25. A pair of braces 26 and 26a extend between the forward end of sled-like member 22 and plates 24 and 24a, respectively, thus providing a rigid structure.

As seen from FIGURES 2 and 3, the sled is provided with a relatively large horizontal surface which bears on the ground and a turned-up, stub-nosed leading edge. The bearing surface 52 is somewhat higher than the lowermost tip 53 of the cutting edge of the apex of the V-blade and is set at a slight angle with respect to the horizontal, thus tilting the plow slightly backward.

The sled itself is provided with a cut out portion 27 to accommodate a coulter 28. Coulter 28 rotates on an axle (not shown) which is journaled in bearings (also not shown). The latter are mounted in adjustable arms 29, one on each side of the coulter, which slide in keyways 30 and 30a. Vertical coulter axle support braces 31 and 32, a pair being provided on each side of the coulter, and horizontal axle support braces 33, rigidly secured to the inside surface of the sled 22, carry means (not shown) for adjustably securing the lower end of arms 29. In this manner, the vertical position of the coulter can be adjusted as desired or necessary.

The above-described V-blade, sled, seeder, and coulter assembly, which constitutes the novel plow, is driven by a tractor (not shown) and is mounted on the tractor doser lift frame 34 in the following manner:

To wings 4 and 4a of the V-blade are secured forward hitch mounting plates 35 and 35a. Rearwardly of the forward hitch mounting plates 35 and 35a there is secured a spreader bar 36 for the V-blade. Rear hitch mounting plates 37 and 37a are welded to wings 4 and 4a, respectively and to spreader bar 36, and are further reinforced by wedges 38 and 38a, respectively. A pair of hitch bracing plates 39 and 39a are secured to the rear mounting plates and carry rear hitch mountings 40 and 40a.

The lift frame 34 is connected to the plow by means of forward vertical mounting pins 41 and horizontal hitch pins 42.

As will be apparent from FIGURES 1–4, when the plow is in operation the coulter, riding ahead of the V-blade, will probe and cut off hardwood stems and roots beneath the surface and thus prevent the tip of the blade from catching on subsurface obstructions. Because the V-blade is flared out at the bottom rearwardly from the center line of the V and is provided with cutting edges 3 and 3a on the flare, and because the stabilizing sled 22 is set for the horizontal portion 43 to be inclined slightly upward in the forward direction, the blade will cut more soil at the edges of the furrow than at the center, thus providing a furrow having a convex profile. Thus, as seen from FIGURE 5, the furrow is provided with a crown 44 in the center and a small ditch 45 along each side to catch any slight wash from the crown. In addition, because of the relatively large bearing surface of the sled and the upturned stub nose 46 of the latter, a relatively level path 47 is provided for the tractor, insuring a furrow of uniform depth. The rear winged out portions 4 and 4a of the V-blade smooth the cast and roll the soil back to form a slight bank 48 along the outside edges of the furrow which serves as a barrier to prevent erosion of the surrounding soil 49 from filling the furrow and covering the seed.

Figure 5:
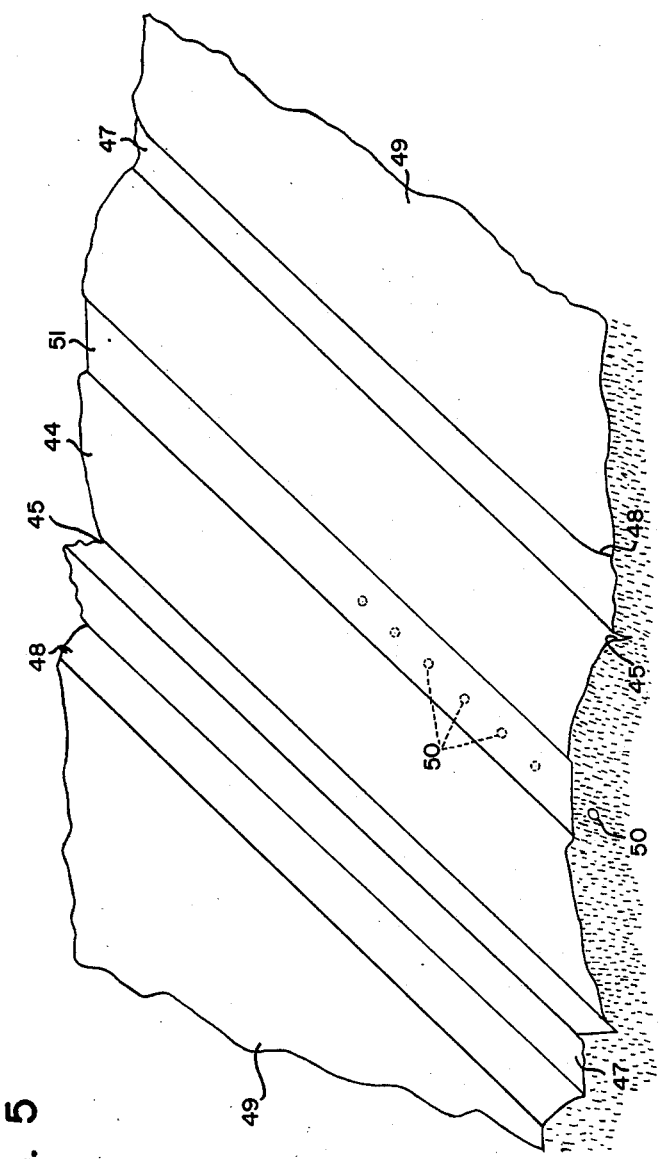
FIGURE 5 is a diagrammatic representation of the furrow cut by the plow and of the position of the seed after planting.

The commercially available seeder can be regulated to deposit seed at the center of the furrow at any desired interval. Seeds 50, so deposited, are illustrated in FIGURE 5. As the tractor pushes the plow forward, wheels 10 and 10a not only operate the seeder through chain 11 and sprocket wheel 9 but, as they roll, press the seed down into the surface to provide a seed bed 51.

The direct seeder of the present invention thus permits clearing and seeding in a single operation in contrast with the two or three steps previously required. In addition, by cutting a furrow having a convex profile, a seed bed is obtained which cannot be covered with additional soil from the eroding sides of the furrow and optimum conditions for germination and growth are maintained.

It will be apparent to those skilled in the art that structural modifications are possible which will not alter the results sought and which are within the scope of the invention.

I claim:
1. A device of the character described comprising:
   (a) a pair of forwardly converging cutting blades joined to form an apex;
   (b) rearwardly and downwardly flared-out soil cutting edges at the bottom of the blades extending rearwardly from said apex;
   (c) wing-like rearward extensions on said blades, said wing-like extensions being undercut to provide lower edges higher than the cutting edges;
   (d) a sled-like member rigidly secured to the blades in front of the apex and higher than the lowermost point of said apex, said sled-like member having a ground-contacting surface also higher than the lowermost point of the apex and forwardly elevated at an angle to the horizontal, whereby the apex is elevated to cause the blades to slant rearwardly downward from the apex; and
   (e) means connected to the rear of the blades and therebetween for hitching the blades to driving means.

2. A seeding device of the character described comprising:
   (a) a pair of forwardly converging cutting blades joined to form an apex;
   (b) rearwardly and downwardly flared-out soil cutting edges at the bottom of the blades extending rearwardly from said apex;
   (c) wing-like rearward extensions on said blades, said wing-like extensions being undercut to provide lower edges higher than the cutting edges;
   (d) a sled-like member rigidly secured to the blades in front of the apex and higher than the lowermost point of said apex, said sled-like member having a ground-contacting surface also higher than the lowermost point of the apex and forwardly elevated at an angle to the horizontal, whereby the apex is elevated to cause the blades to slant rearwardly downward from the apex;
   (e) means connected to the rear of the blades and therebetween for hitching the blades to driving means;
   (f) seed-depositing means mounted between the blades to the rear of the apex for depositing seed on the ground as the blades are driven forward; and
   (g) means mounted between the blades to the rear of the seed-depositing means for pressing deposited seed into the surface of the ground.

References Cited in the file of this patent

UNITED STATES PATENTS

| | | |
|---|---|---|
| 275,919 | Jones | Apr. 17, 1883 |
| 375,081 | Lynch | Dec. 20, 1887 |
| 411,696 | Watson | Sept. 24, 1889 |
| 740,091 | Cole | Sept. 29, 1903 |
| 1,580,405 | Brown | Apr. 13, 1926 |
| 2,357,849 | Ray | Sept. 12, 1944 |
| 2,475,078 | Cherry | July 5, 1949 |
| 2,684,543 | Cundiff | July 27, 1954 |
| 2,687,682 | Oehler | Aug. 31, 1954 |
| 2,864,181 | Simmons | Dec. 16, 1958 |
| 2,955,369 | Shumaker | Oct. 11, 1960 |

FOREIGN PATENTS

| | | |
|---|---|---|
| 15,356 | Denmark | Nov. 23, 1911 |
| 69,262 | Denmark | Mar. 9, 1949 |
| 1,091,998 | France | Nov. 3, 1954 |